United States Patent [19]
Pausch et al.

[11] Patent Number: 5,096,230
[45] Date of Patent: Mar. 17, 1992

[54] QUICK RELEASE ADAPTER FOR CONNECTING AN EXHAUST REMOVAL HOSE TO A VEHICLE TAIL PIPE USING MAGNETS

[75] Inventors: Josef Pausch, Hopkins; Harvey S. Lewis, St. Paul; Glen Kampa, Hopkins, all of Minn.

[73] Assignee: General Resource Corporation, Hopkins, Minn.

[21] Appl. No.: 672,443

[22] Filed: Mar. 20, 1991

[51] Int. Cl.$^5$ ............................................. F16L 37/00
[52] U.S. Cl. ................................... 285/9.1; 285/62; 285/304; 454/63
[58] Field of Search ................... 285/9.1, 9.2, 62, 1, 285/304; 104/52; 98/115.4

[56] References Cited

U.S. PATENT DOCUMENTS

| | | | |
|---|---|---|---|
| 2,495,092 | 1/1950 | Cox et al. | 285/9.2 |
| 2,733,668 | 2/1956 | Pfetzing | 285/62 |
| 2,793,057 | 5/1957 | McGugin | 285/9.1 |
| 2,990,198 | 6/1961 | Imming | 285/9.1 |
| 3,280,896 | 10/1966 | Goodson | 285/9.1 |
| 4,012,058 | 3/1977 | Patton | 285/9.1 |
| 4,051,768 | 10/1977 | Bayles | 285/9.1 |
| 4,102,254 | 7/1978 | Grant | 98/115.4 |
| 4,724,751 | 2/1988 | Jentzsch et al. | 98/115.4 |
| 4,796,520 | 1/1989 | Kramer, Jr. | 98/115.4 |
| 4,906,032 | 3/1990 | Hohman | 285/319 |

FOREIGN PATENT DOCUMENTS

| | | | |
|---|---|---|---|
| 1466542 | 1/1967 | France | 285/9.1 |
| 1556679 | 2/1969 | France | 285/9.1 |
| 983278 | 2/1965 | United Kingdom | 285/9.1 |
| 2010473 | 6/1979 | United Kingdom | 98/115.4 |

Primary Examiner—Eric K. Nicholson
Attorney, Agent, or Firm—Palmatier & Sjoquist

[57] ABSTRACT

A quick-release adapter for connecting the inlet of an exhaust removal hose to the outlet of a tail pipe of a vehicle with an internal combustion engine while minimizing exhaust leakage. The adapter includes three disk-like permanent magnets pivotably mounted on the inlet of exhaust removal hose and three receptacle-shaped magnetic connectors secured to the outlet of the tail pipe for engaging the magnets and mating the exhaust removal hose to the tail pipe. The exhaust removal hose is thus readily connectable to and disconnectable from the tail pipe.

19 Claims, 1 Drawing Sheet

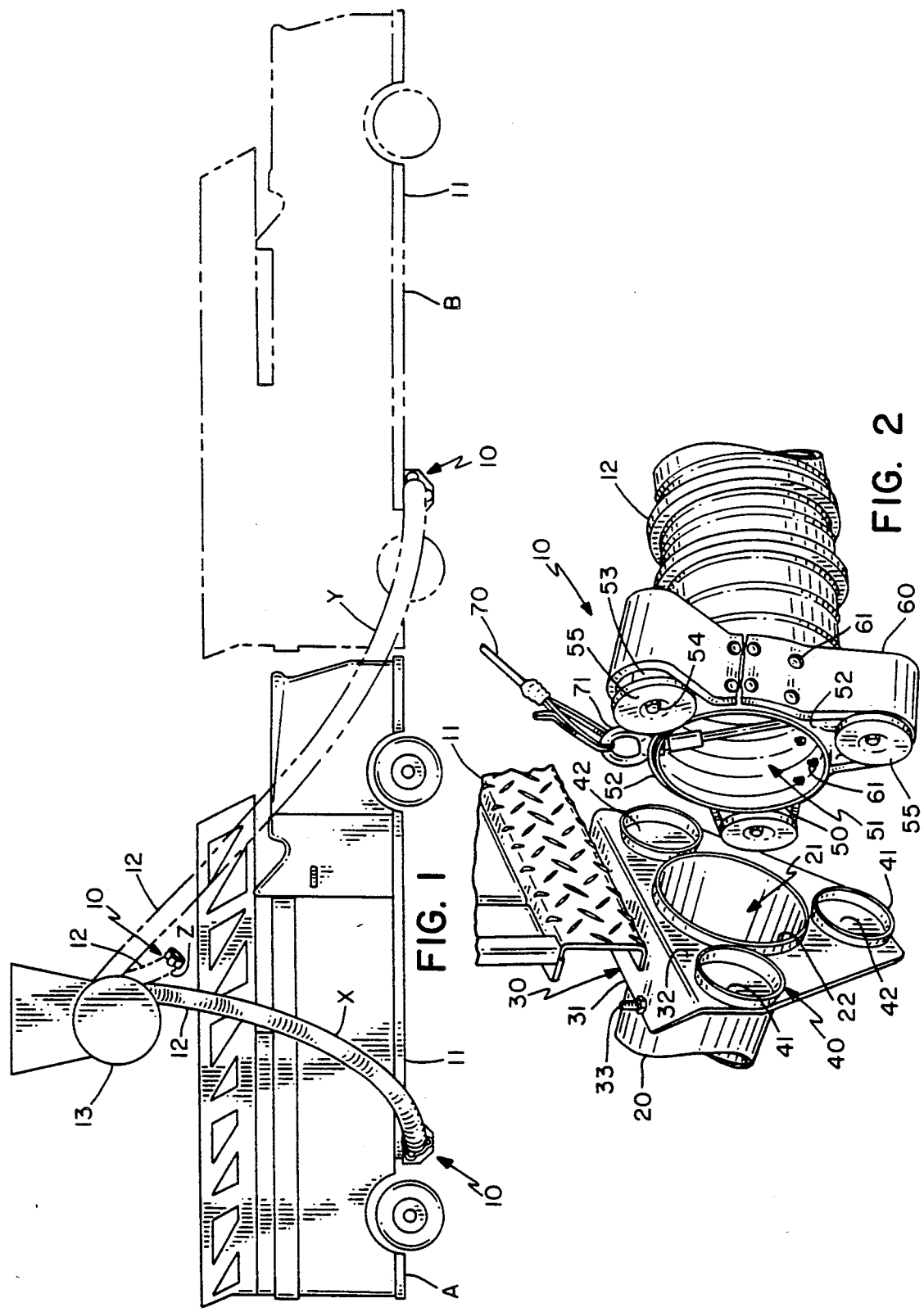

5,096,230

QUICK RELEASE ADAPTER FOR CONNECTING AN EXHAUST REMOVAL HOSE TO A VEHICLE TAIL PIPE USING MAGNETS

The present invention relates to connections between the tail pipe of an internal combustion vehicle and an exhaust removal hose and, more particularly, to quick release features of such connections.

BACKGROUND OF THE INVENTION

It is frequently necessary to operate internal combustion engines in enclosed spaces, for preventive maintenance and other purposes. For example, vehicle repair shops typically operate vehicle engines inside of the enclosed shop in order to perform maintenance operations. In such situations it is routine to utilize a flexible hose which has one end connected to the exterior of the building and the other end is inserted over the tail pipe of the vehicle, in order to duct the vehicle exhaust gases to the outside. In some situations it is necessary or desirable to leave the vehicle engine in a running condition for an extended period of time, for emergency or other purposes. For example fire engines are frequently operated with the engine running while inside the firehouse. In these cases, flexible hoses are also used to convey exhaust gases to the exterior.

In the case of fire engines and other emergency vehicles, it is desirable that an exhaust system ducting arrangement be quickly disconnectable, so that in an emergency situation the exhaust duct can be disconnected from the vehicle in order to permit the vehicle to respond to the emergency. It is, moreover, desirable that such exhaust gas couplers be more or less automatically removable so that no special attention need be given to the removal in responding to an emergency.

Carbon monoxide is but one of many contaminates emitted by an internal combustion engine. Other contaminates found in exhaust include benzene, nitrogen dioxide, nitric oxide, sulfur dioxide, formaldehyde, ethylene, phenol, and acrolein. OSHA has recently focused attention on setting limits for exposure to these contaminates. Diesel internal combustion engines may emit these contaminates in more dangerous forms than do gasoline engines.

SUMMARY OF THE INVENTION

A feature of the present invention includes the provision in a quick-release adaptor for connecting the inlet of an exhaust removal hose to the outlet of a tail pipe of a vehicle with an internal combustion engine, of a first connector on the tail pipe and a cooperating connector on the exhaust removal hose to provide a quick release connection between the exhaust removal hose and tail pipe.

Another feature is the provision in such an adapter, of one of the connectors comprising a magnet.

Another feature is the provision in such an adapter, of one of the connectors having retaining means for minimizing movement of the cooperating connectors transversely of each other to minimize exhaust leakage.

Another feature is the provision in such an adapter, of one of the connectors being pivotable to compensate for relative movement between the tail pipe and the exhaust removal hose.

Another feature is the provision in such an adapter, of a plate extending about the periphery of the tail pipe for engaging an inlet of the exhaust removal hose to seal the inlet of the exhaust removal hose relative to the outlet of the tail pipe of the vehicle.

Another feature is the provision in such an adapter, of a first set of at least three quick-release connectors on the tail pipe and a second set of at least three quick-release connectors on the exhaust removal hose for engaging the first set of connectors such that the exhaust removal hose is readily and properly engagable with the tail pipe.

An advantage of the present invention is a reduction in the amount of indoor contaminants from internal combustion engines.

Another advantage is that the present invention provides for a consistent, bind-free release of the exhaust removal hose from the tail pipe.

Another advantage is that the present invention is simple and inexpensive and requires a minimum amount of maintenance and attention to its operation.

Another advantage is that the present invention is readily positionable in a sealing engagement to minimize human error in making such a connection.

BRIEF DESCRIPTION OF THE DRAWINGS

FIG 1 is an elevation, partially phantom view of the present quick-release adapter connected between the tail pipe of a fire engine, which is shown in parked and exiting positions, and an exhaust removal hose, which is shown in partially extended, fully extended, and retracted positions.

FIG. 2 is a detail, perspective view of the adapter of FIG. 1.

DETAILED DESCRIPTION OF THE PREFERRED EMBODIMENTS

As shown in FIG. 1, the present adapter is indicated in general by the reference numeral 10 and provides for a quick-release connection between a fire engine 11 and an exhaust removal hose 12. The exhaust removal hose 12 is extendable from and retractable into a spring-torsioned hose storage reel 13 affixed in the interior of a structure such as a firehouse. Reference letters A and B denote parked and exiting locations, respectively, for the fire engine 11. Reference letters X, Y and Z denote partially extended, fully extended, and retracted positions for the exhaust removal hose 12.

As shown in FIG. 2, the fire engine 11 includes a tail pipe 20 with an outlet 21. The outlet 21 is defined by a peripheral distal edge 22 of the tail pipe 20.

A triangular-like bracket 30 with a flange portion 31 and a plate portion 32 is disposed adjacent the outlet 21 of the tail pipe 20. The bracket 30 is secured to the tail pipe 20 via a U-bolt pin connector 33 extending about the tail pipe 20 and being bolted to flange portion 31.

A set of three magnetic first connectors 40 are welded to the plate portion 32 of the bracket 30. Each of the connectors 40 is receptacle-shaped and includes an annular peripheral retaining lip or retaining means 41. Each of the connectors 40 also includes a metallic, magnetic floor 42 which is preferably merely a portion of the plate 32, but which alternatively may be a separate piece from the plate 32. A permanent magnet is adherable to the magnetic floor 42.

The exhaust removal hose 12 includes a proximal peripheral edge 50 which defines an exhaust inlet 51. An annular, relatively wide brace 52 is affixed to and surrounds the exhaust removal hose 12 adjacent the peripheral edge 50. Three connector mounts 53 extend typically integrally from the brace 52 and form threaded holes for receiving bolts 54. The bolts 54 somewhat loosely engage a set of disk-like permanent magnet connectors 55 such that the connectors 55 are pivotable relative an axis extending longitudinally through the bolts 54 to allow relative movement between the connectors 40, 55. The magnet connectors 55 typically are engaged such as to also allow some spin of the magnet connectors 55. Each of the disk-like magnet connectors 55 includes an annular-like surface with a sunken center portion for receiving the head of its respective bolt 54. The diameter of the disk-like magnet 55 is slightly less than the internal diameter of the annular lip 41 to limit transverse movement of the magnet connector 55 relative to its respective magnetic connector 40.

It should be noted that the magnet connectors 55 may be on the plate 32 and the metallic connectors 40 may be on the brace 52. It should also be noted that the connectors 40, 50 may be of any comparable adhesive means, although the connectors 40, 55 preferably comprise the metallic, magnetic floor 42 and a permanent magnet connector 55, respectively.

A set of three durable rubber shrouds 60 undulates about each of the connector mounts 53 to protect the adapter 10 as a whole and the disk-like connectors 55 in particular from abrasions or scrapes such as when the exhaust removal hose 12 disengages from the tail pipe 20. Each of the shrouds 60 is affixed to the brace 52 and exhaust removal hose 12 adjacent the distal edge 50 via pin connectors 61 extending through the shrouds 60, brace 52, and hose 12.

A wire rope 70 extends from the exhaust removal hose 12 to draw the hose 12 downwardly from its retracted position Z in the storage reel 13. The rope 70 may also support the distal edge 50 and the magnet connectors 55 and shrouds 60 from hitting the floor when the connectors 55 disengage from the fire engine 11. The rope 70 engages a pin connector 71 which extends through the brace 52 and into the inlet 51.

The exhaust removal hose 12 is typically formed of a two-ply silicon-coated Nomex TM reinforced fabric. The hose operation temperature range is typically from −80° F. to 600° F. and includes a pressure range of −3–30 psig.

In operation, to connect the exhaust removal hose 12 to the tail pipe 20, the hose 12 is grasped adjacent to or on the shroud 60 and maneuvered such that the magnet connectors 55 are brought near the magnetic connectors 40, whereupon the permanent magnet connectors 55 are attracted by the magnetic floor 42 and adhere thereto. As such adhesion occurs, the peripheral edge 50 of the exhaust removal hose 12 fits over the peripheral edge 22 of the tail pipe and engages the plate 32 to minimize exhaust leakage between the tail pipe 20 and the exhaust removal hose 12.

When an emergency beckons and the fire engine 11 is driven from a parked location as shown by reference letter A to the exiting position as shown by reference letter B, the exhaust removal hose 12 travels with the fire engine 11 and remains connected to and conveying exhaust from the tail pipe 20. During such travel, the magnet connectors 55 may engage the peripheral lips 41 of the connectors 40 to minimize transverse movement between the peripheral edges 50 and 22 of the tail pipe 20 and exhaust removal hose 12. Also during such travel, the magnet connectors 55 may pivot somewhat to compensate for relative movement between the tail pipe 20 and the exhaust removal hose 12. Accordingly, the chances of a premature disengagement of exhaust removal hose 12 from the tail pipe 20 are minimized. When the fire engine 11 reaches a predetermined exit, perhaps defined by the fully extended hose 12 as shown in FIG. 1, the magnet connectors 55 automatically disengage from the magnetic connectors 40. Subsequently, the spring torsion hose reel 13 retracts the hose 12 to the storage position shown by reference letter Z.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A quick-release adapter for connecting the inlet of an exhaust removal hose to the outlet of a tail pipe of a vehicle with an internal combustion engine, comprising:
   a) a first set of at least three magnetic connectors extending from the tail pipe of the vehicle and being disposed adjacent the outlet of the tail pipe, and
   b) a second set of at least three magnetic connectors on the exhaust removal hose and being disposed adjacent the inlet of the exhaust removal hose for engaging the first set of connectors, whereby the inlet of the exhaust removal hose is readily connectable to and disconnectable from the outlet of the tail pipe.

2. The adapter according to claim 1, wherein one of the connectors comprises a magnet.

3. The adapter according to claim 1, wherein one of the connectors comprises retaining means for minimizing movement of the connectors transversely of each other such that exhaust leakage between the exhaust removal hose and tail pipe is minimized.

4. The adapter according to claim 3, wherein the retaining means comprises a lip extending from one of the connectors for engaging the other connector.

5. The adapter according to claim 1, wherein each of the connectors is equally spaced from each of the other connectors within its own set and the connectors extending from the tail pipe are spaced about the tail pipe.

6. The adapter according to claim 1, wherein one of the connectors is pivotable to compensate for relative movement between the tail pipe and exhaust removal hose.

7. The adapter according to claim 6, wherein the pivotable connector is secured to the exhaust hose.

8. The adapter according to claim 2, wherein the magnet connector is secured to the exhaust removal hose.

9. The adapter according to claim 1, and further comprising a plate extending about the periphery of the tail pipe for engaging the inlet of the exhaust removal hose to seal the inlet of the exhaust removal hose relative to the outlet of the tail pipe to minimize exhaust leakage.

10. The adapter according to claim 1, wherein one of the connectors is receptacle-shaped and the other connector is disk-like in shape, the disk-like connector having a diameter slightly less than the diameter of the receptacle-shaped connector to minimize movement of the connectors transversely of each other.

11. A quick-release adapter for connecting the inlet of an exhaust removal hose to the outlet of a tail pipe of a vehicle with an internal combustion engine, comprising:
   a) a set of at least three quick-release first magnetic connectors extending about the tail pipe of the vehicle and being disposed adjacent the outlet of the tail pipe, and b) a set of at least three quick-release second magnetic connectors on the exhaust removal hose and being disposed adjacent the inlet of the exhaust removal hose for engaging the first connectors whereby the inlet of the exhaust removal hose is readily connectable to and disconnectable from the outlet of the tail pipe.

12. The adapter according to claim 11, wherein each of the connectors of one of the sets comprises a magnet.

13. The adapter according to claim 11, wherein each of the connectors of one of the sets comprises retaining means for minimizing movement of the first and second connectors transversely of each other such that exhaust leakage between the exhaust removal hose and tail pipe is minimized.

14. The adapter according to claim 11, wherein each of the connectors of one of the sets is receptacle-shaped and each of the connectors of the other set is disk-like in shape, each of the disk-like connectors having a diameter slightly less than the diameter of each of the receptacle-shaped connectors.

15. The adapter according to claim 11, wherein each of the connectors of one of the sets is pivotable to compensate for relative movement between the tail pipe and exhaust removal hose.

16. The adapter according to claim 11, and further comprising a plate extending about the periphery of the tail pipe for engaging the inlet of the exhaust removal hose to seal the inlet of the exhaust removal hose relative to the outlet of the tail pipe to minimize exhaust leakage.

17. An adapter for connecting the inlet of an exhaust removal hose to the outlet of a tail pipe of a vehicle with an internal combustion engine, comprising:

a) a plate extending from the tail pipe of the vehicle and being disposed adjacent to and about the periphery of the outlet of the tail pipe for engaging the inlet of the exhaust removal hose, b) a set of at least three magnetic connectors affixed to the plate, each of the magnetic connectors being receptacle-shaped with a peripheral lip, the magnetic connectors being equally spaced from each other, the magnetic connectors extending about the tail pipe, c) a set of at least three magnet connectors for engaging the magnetic connectors and being affixed to the inlet of the exhaust removal hose, each of the magnet connectors being disk-like in shape and pivotable about an axis, each of the magnet connectors being equally spaced from each other, the diameter of the magnet connectors being slightly less than the diameter of the magnetic connectors such that transverse movement of the magnet connectors relative to the magnetic connectors is minimized by the magnet connectors engaging the peripheral lips of the magnetic connectors, whereby the exhaust removal hose is readily connectable to and disconnectable from the outlet of the tail pipe while minimizing exhaust leakage.

18. A quick-release adapter for connecting the inlet of an exhaust removal hose to the outlet of a tail pipe of a vehicle with an internal combustion engine, comprising:

a) a first magnetic connector extending from the tail pipe of the vehicle and being disposed adjacent the outlet of the tail pipe, b) a second magnetic connector on the exhaust removal hose and being disposed adjacent the inlet of the exhaust removal hose for engaging the first connector, and c) a plate extending about the periphery of the tail pipe for engaging the inlet of the exhaust removal hose to seal the inlet of the exhaust removal hose relative to the outlet of the tail pipe to minimize exhaust leakage, whereby the inlet of the exhaust removal hose is readily connectable to and disconnectable from the outlet of the tail pipe.

19. A quick-release adapter for connecting the inlet of an exhaust removal hose to the outlet of a tail pipe of a vehicle with an internal combustion engine, comprising:

a) a first magnetic connector extending from the tail pipe of the vehicle and being disposed adjacent the outlet of the tail pipe, b) a second magnetic connector on the exhaust removal hose and being disposed adjacent the inlet of the exhaust removal hose for engaging the first connector, and c) one of the connectors being receptacle-shaped and the other connector being disk-like in shape, the disk-like connector having a diameter slightly less than the diameter of the receptacle-shaped connector to minimize movement of the connectors transversely of each other, whereby the inlet of the exhaust removal hose is readily connectable to and disconnectable from the outlet of the tail pipe.

* * * * *